(No Model.)
J. S. WEBER.
COTTON CHOPPER.
No. 497,106.　　　　　　　　　Patented May 9, 1893.
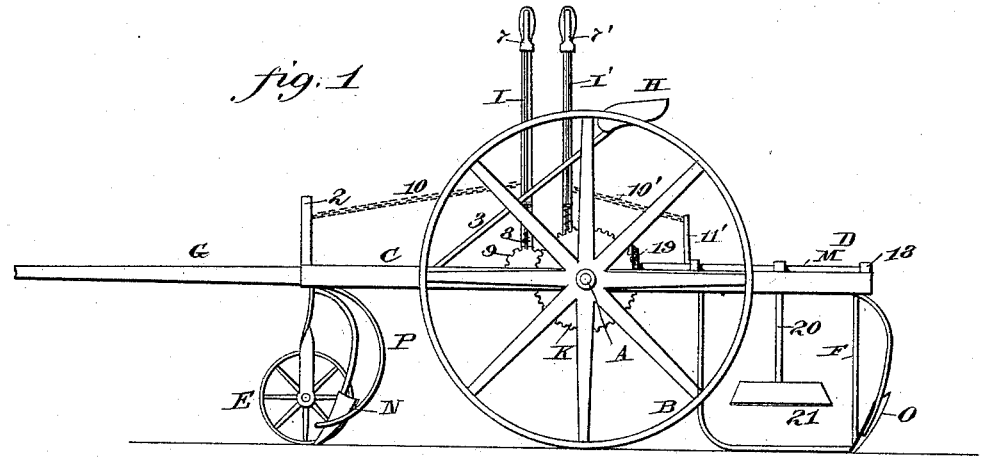
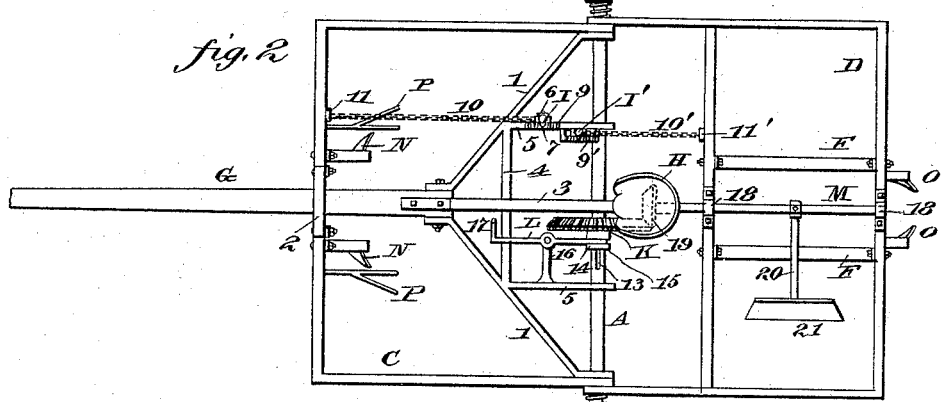
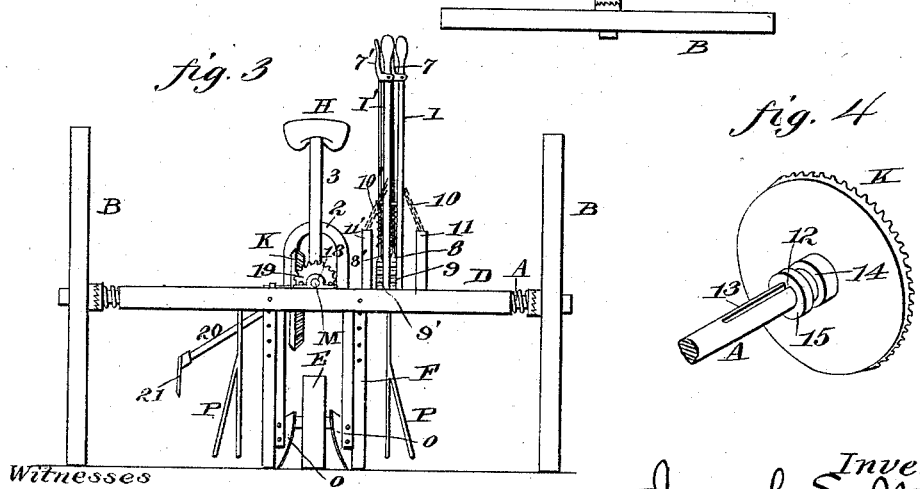
Witnesses
J. F. Coleman
M. H. J. Coleman
Inventor
Jacob S. Weber
By S. C. Fitzgerald
Atty.

UNITED STATES PATENT OFFICE.

JACOB S. WEBER, OF KINSEY, MISSOURI.

COTTON-CHOPPER.

SPECIFICATION forming part of Letters Patent No. 497,106, dated May 9, 1893.

Application filed February 25, 1893. Serial No. 463,745. (No model.)

*To all whom it may concern:*

Be it known that I, JACOB S. WEBER, a citizen of the United States, residing at Kinsey, in the county of St. Genevieve, State of Missouri, have invented certain new and useful Improvements in Cotton-Choppers; and I do hereby declare the following to be a full, clear, and exact description of the invention, such as will enable others skilled in the art to which it appertains to make and use the same.

My invention relates to improvements in cotton-cultivating machinery, and particularly to that class known as cotton-choppers.

The invention will first be described in connection with the accompanying drawings, and then pointed out in the claims.

In the drawings, Figure 1 is a side view of my improved cotton-chopping apparatus. Fig. 2 is a plan view of the same. Fig. 3 is a rear end view of the same. Fig. 4 is a detail view of the gear-wheel.

Referring to the drawings, A is an axle provided in the usual manner with wheels B fixed to the axle and adapted to rotate the same when the apparatus is drawn along the ground. To the axle is pivotally attached a front frame C and a rear frame D, the front frame being supported by a vertically-adjustable wheel E, and the rear frame being carried by vertically-adjustable runners F, as is fully shown by the drawings.

G is the tongue or pole also pivotally attached to the axle A by its shanks 1, and passing beneath an arch 2 formed in the front frame.

H is a seat, secured to a seat-brace 3, which is attached to the tongue, a foot-rest 4, being secured across the space between the pole-shanks 1 and braced by side-bars 5, pivotally attached to the axle A.

I is a raising lever, pivoted in a bearing 6 and provided with the usual spring-lever 7 adapted to operate a pawl 8, normally in engagement with a ratchet-toothed segment 9 secured on one of the side-bars 5 at the right of the seat H. The raising-lever I is attached, by means of a chain 10, to an upright 11 fixed to the front frame C. It is apparent that by throwing back the lever I the front frame C may be elevated, swinging on the main axle A as a fulcrum, the frame being held in this position by the pawl 8 engaging the teeth in the segment 9. To lower the frame C the spring-lever 7 is operated to withdraw the pawl from the segment. The rear frame D is also adapted to be raised and lowered in a similar manner by means of a raising-lever I′, spring-lever 7′, pawl 8′, segment 9′, chain 10′ and upright 11′, the latter being fixed to the rear frame as shown. It is obvious that the lever I′ must move in an opposite direction to the lever I in order to properly raise its respective frame, and therefore the pawl 8′ is arranged to lock lever I′ when moving in a direction opposite to that which causes pawl 8 to lock the lever I.

K is a bevel gear-wheel provided with a key 12 engaging a slot 13 in the axle, this key and slot permitting the movement of the gear-wheel longitudinally on the axle, yet compelling the axle to rotate the gear-wheel when the apparatus is in use. To move this gear-wheel K longitudinally as above stated, a shifting-lever L, forked at one end for engagement with a circumferential groove 14 in the hub 15 of the gear-wheel, is provided, this shifting-lever L being pivoted at 16 to the left-hand side-bar and having a bent foot-piece 17 by means of which the lever may be moved from side to side, as desired, by the foot of the operator when sitting in seat H.

M is a revoluble hoe-shaft journaled in the rear frame at 18 and provided with a pinion 19 adapted to be engaged by the gear-wheel K, whereby the hoe-shaft may be revolved or not, as desired, from the main axle A. On the hoe-shaft is fixed a radial arm 20 carrying a hoe 21, the arm 20 being adjustable to permit the hoe at each revolution of the hoe-shaft to strike close to the ground and thus chop out the plants; and as the machine is carried forward over the ground some distance before the hoe can make one revolution, it is apparent that some of the plants will be left unharmed in the rows.

N are plows or cultivators, attached to the front frame and adapted to stir the soil in advance of the chopping machinery.

O are rear plows or cultivators for the purpose of turning under the plants chopped out by the hoe.

P are trash-forks attached to the front frame and adapted to catch and hold such heavy trash and brush as would otherwise seriously endanger or interfere with the operation of the hoe.

The operation of my improved machine is so obvious from what has been said as to render a further description unnecessary.

Having thus fully described my invention, what I claim as new, and desire to secure by Letters Patent, is—

1. The combination, with an axle, and a pair of wheels fixed on the axle, of a tongue, a front frame, and a rear frame, each independently pivoted on the axle, substantially as described and for the purpose set forth.

2. The combination, with an axle, and a pair of wheels fixed on the axle, of a tongue, a front frame, and a rear frame, each independently pivoted on the axle, and means for raising and lowering each frame, substantially as described and for the purpose set forth.

3. The combination, with an axle, a pair of wheels fixed on the axle, and a tongue, of a front frame and a rear frame, each independently pivoted on the axle, a pair of levers pivoted on the tongue, and means for connecting each lever to one of the frames, substantially as described and for the purpose set forth.

4. The combination, with an axle, and a pair of wheels fixed on the axle, of a front frame pivoted to the axle and provided with an arch, and a tongue passing beneath the arch and pivoted to the axle independent of the front frame, substantially as described and for the purpose set forth.

5. The combination, with a slotted axle, a pair of driving wheels fixed thereon, a tongue pivoted on the axle and carrying a foot rest, and a front frame pivoted on the axle and provided with an arch beneath which the tongue passes, of a wheel secured to the front frame, a rear frame pivoted on the axle, a series of runners secured to the rear frame, a hoe-shaft journaled in said frame, a hoe and a pinion fixed on the hoe-shaft, a gear wheel mounted on the axle and adapted to engage the pinion, a shifting-lever pivoted to the foot-rest and engaging the gear wheel, a pair of levers mounted on the tongue and connected to the front and rear frames respectively, and a series of cultivators attached to the front and rear frames, substantially as described and for the purpose set forth.

In testimony whereof I affix my signature in presence of two witnesses.

JACOB S. WEBER.

Witnesses:
FRIDOLIN. M. BAYER,
CHARLES BAYER.